United States Patent Office 3,272,775
Patented Sept. 13, 1966

3,272,775
PREPARATION OF AROMATIC POLYETHERS
FROM A BISPHENOL
Edward J. McNelis, Wallingford, Pa., assignor to Sun Oil Company, Philadelphia, Pa., a corporation of New Jersey
No Drawing. Filed July 16, 1964, Ser. No. 383,252
17 Claims. (Cl. 260—47)

This invention relates to aromaic polyethers and more particularly to a method for preparing such ethers by polymerizing an aromatic bis-phenol in the presence of activated manganese dioxide in accordance with the following reaction:

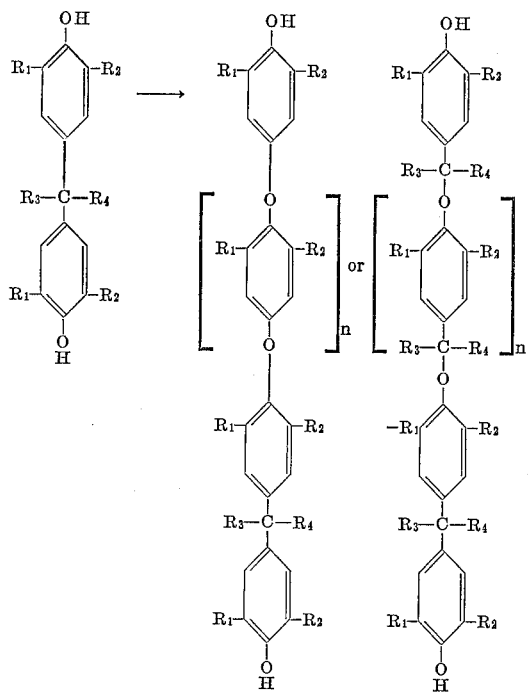

wherein $R_1$, $R_2$, $R_3$, and $R_4$ are selected from the group consisting of hydrogen and alkyl radicals having from 1 to 3 carbon atoms and n is an integer greater than 0 and can range up to about 20,000.

Aromatic polyethers of high molecular weight are of value as thermoplastic resins which may be extruded or molded at elevated temperatures and pressures to form solid rigid materials which are insoluble in most solvents. The lower molecular weight materials find particular utility as insecticides, fuel and lubricant additives and plasticizers. Heretofore these types of materials have been prepared by a number of methods such as the well known Ullmann synthesis as described and referred to in "Synthetic Organic Chemistry" by Wagner and Zook, John Wiley and Sons (1953), page 227 and references cited therein. Briefly, that method involves treating an alkali metal salt of a phenol with an aryl halide or polyhalide in the presence of a catalyst such as copper at temperatures ranging between 200° C. and 300° C. for 0.5 hour to 10 hours, pouring the hot mixture into a solvent such as toluene or xylene, filtering the insoluble alkali metal halide, washing with aqueous caustic to remove excess phenol, and removing the solvent by distillation or evaporation to isolate the polyphenyl ether or derivatives thereof.

A method has now been found whereby aromatic polyethers can be prepared directly from aromatic bis-phenols utilizing activated manganese dioxide.

Briefly stated the instant invention comprises contacting an aromatic bis-phenol with activated manganese dioxide at a temperature in the range of 20° C. to 250° C. for a period of time ranging between 10 seconds and 10 hours and recovering an aromatic polyether.

"Activated manganese dioxide" is a well known material (see Evans, Quarterly Reviews, 13, pp. 61-70, 1959). It is a form of hydrated manganese dioxide and is generally prepared by reacting manganese sulfate with potassium permanganate in a hot aqueous solution in the presence of sufficient alkali to insure that the reaction mixture remains alkaline. After being washed with water, the resulting slurry is dried at 100°–120° C. and activated manganese dioxide is recovered. It can also be prepared by reacting manganese sulfate and potassium permanganate in a hot aqueous solution in the absence of any alkali. The resulting mixture becomes strongly acidic and after drying the slurry at 100°–120° C., activated manganese dioxide is recovered. Activated manganese dioxide is also prepared by heating manganese oxalate or manganese carbonate at 250° C. The resulting product may be used as produced or it can be washed with dilute aqueous nitric acid and subsequently dried at 230° C.

Suitable starting materials which can be used to prepare the aromatic polyethers in accordance with this invention have the general formula

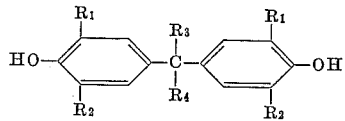

wherein $R_1$, $R_2$, $R_3$, and $R_4$ are selected from the group consisting of hydrogen and alkyl radicals from 1 to 3 carbon atoms. Examples of specific compounds include 2,2' - bis(4-hydroxy-3-methyl phenyl)propane, 2,2'-bis(4-hydroxy phenyl)propane, and 2,2'-bis(4 - hydroxy - 3,5-dimethyl phenyl)propane.

As stated above, in accordance with this invention, a bis-phenol is contacted with activated manganese dioxide to produce aromatic polyethers. The bis-phenol can be contacted with the activated manganese dioxide either in the presence or absence of a solvent material and in the presence or absence of air.

It is preferred that prior to contacting the bis-phenol with activated manganese dioxide, it be dissolved in a suitable solvent and the activated manganese dioxide be added to the resulting solution. Examples of suitable solvents include chloroform, benzene, toluene, nitrobenzene, dimethylformamide, ethyl ether and petroleum ether. Chloroform and benzene are the preferred solvents.

If the bis-phenol is contacted with activated manganese dioxide in the absence of air, there are produced relatively low molecular weight polymeric products ranging from liquids to solids. The molecular weight of these materials generally will range between about 1000 and 10,000.

If, however, higher molecular weight materials are desired, the bis-phenol is contacted with activated manganese dioxide in the presence of air or oxygen. The polymeric products so produced have a molecular weight of the order of magnitude of 20,000.

The temperature at which either the bis-phenol—activated manganese dioxide mixture or solution of bis-phenol—activated manganese dioxide mixture is contacted can vary over a wide range. It has been found that substantial amounts of aromatic polyether products are produced at a temperature as low as 20° C. If the bis-phenol is not contained in a solvent, the maximum temperature to which the reaction mass can be heated is governed only by the decomposition temperature of the monomer. If the bis-phenol is dissolved in a solvent prior to the addition thereto of the activated manganese dioxide, the maximum temperature to which the reaction mass can be heated is governed by the boiling point of the solvent at the pressure used. While temperatures ranging between about 20° C. to as high as about 250° C. can be used in this invention, it is preferred that a temperature ranging between about 60° C. and 250° C. be used.

The time that the reaction mixture is contacted can vary between 10 seconds and 10 hours. It is preferred that the contacting time range between about 0.5 hour and 2 hours.

The molar ratio of activated manganese dioxide to bis-phenol can also vary over wide limits. It has been found that if trace amounts of activated manganese dioxide are present in the reaction mass, there is produced some polymeric product. It is preferred, however, that in order to optimize the amount of polymer produced, the molar ratio of activated manganese dioxide to bis-phenol be in the range of from about 1:100 to 100:1 with a molar ratio ranging between about 3:1 and 10:1 being most preferred.

To recover the desired product, the reaction mass is first separated, such as by filtration, and the filtrate is washed with a dilute solution of aqueous sodium hydroxide. The polymer can be obtained from the solvent by evaporation or it can be precipitated by pouring the solution into excess methanol.

The following example will serve to further illustrate the instant invention:

Example

To 3.40 g. of 2,2'-bis-(4-hydroxy-3,5-dimethylphenyl) propane dissolved in 50 ml. of benzene there were added 8.7 g. of activated manganese dioxide. The resulting mixture was refluxed for two hours in an atmosphere of nitrogen. At the end of the reaction time the mixture was separated by filtration and the benzene filtrate was washed with 100 ml. of 5 percent aqueous sodium hydroxide. Upon evaporation of the benzene solvent there was recovered a residue which weighed 2.31 g. This residue was extracted with low boiling petroleum ether (B.P. 30°–60° C.). There remained a solid polymeric material (2.12 g.), which had an infrared analysis substantially identical to polymer derived by the oxidative polymerization of mesitol. The polymer was coagulated by chloroform/methanol treatment and the molecular weight of the resultant solid was found to be 6800.

Substantially similar results are obtained when other of the solvents named above are substituted for benzene and when other monomers such as 2,2'-bis-(4-hydroxy-3-methyl phenyl) propane and 2,2'-bis-(4-hydroxy phenyl) propane are utilized in lieu of the above bis-phenol.

I claim:

1. Method for preparing aromatic polyethers which comprises contacting a material having the general formula

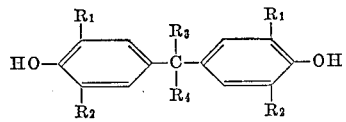

wherein $R_1$, $R_2$, $R_3$, and $R_4$ are selected from the group consisting of hydrogen and alkyl radicals having from 1 to 3 carbon atoms with activated manganese dioxide at a temperature in the range of from 20° to 250° C. for a period of time ranging between 10 seconds and 10 hours and thereafter recovering said aromatic polyether product.

2. Method in accordance with claim 1 wherein the temperature is in the range of from 60° to 250° C. for a period of time of from 0.5 hour to 2 hours.

3. Method in accordance with claim 2 wherein the contacting is conducted in the presence of air.

4. Method in accordance with claim 1 wherein the contacting is conducted in the presence of air.

5. Method for preparing aromatic polyethers which comprises dissolving a material having the general formula

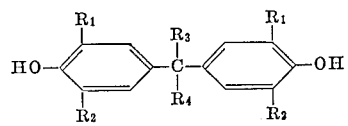

wherein $R_1$, $R_2$, $R_3$, and $R_4$ are selected from the group consisting of hydrogen and alkyl radicals having from 1 to 3 carbon atoms, in a solvent and contacting the resulting solution with activated manganese dioxide at a temperature in the range of from 20° to 250° C. for a period of time ranging between 10 seconds and 10 hours and thereafter recovering said aromatic polyether product.

6. Method in accordance with claim 5 wherein said solvent is selected from the group consisting of choroform, benzene, toluene, nitrobenzene, and dimethylformamide.

7. Method in accordance with claim 6 wherein the temperature is in the range of from 60° to 250° C. for a period of time of from 0.5 hour to 2 hours.

8. Method in accordance with claim 5 wherein the temperature is in the range of from 60° C. to 250° C. for a period of time of from 0.5 hour to 2 hours.

9. Method for preparing aromatic polyethers which comprises contacting 2,2' - bis - (4 - hydroxy - 3,5 - dimethyl phenyl)propane with from 0.01 to 100.0 moles of lead dioxide per mole of 2,2' - bis - (4-hydroxy-3,5-dimethyl phenyl)propane at a temperature in the range of from 20° to 250° C. for a period of time ranging between 10 seconds and 10 hours and thereafter recovering said aromatic polyether.

10. Method according to claim 9 wherein the molar ratio of activated manganese dioxide to 2,2'-bis-(4-hydroxy-3,5-dimethyl)propane ranges between 3.0:1.0 and 10.0:1.0.

11. Method according to claim 10 wherein the temperature is in the range of from 60° to 250° C. for a period of time of from 0.5 to 2 hours.

12. Method according to claim 9 wherein the temperature is in the range of from 60° to 250° C. for a period of time of from 0.5 to 2 hours.

13. Method for preparing aromatic polyethers which comprises dissolving 2,2' - bis - (4 - hydroxy - 3,5 - dimethyl phenyl)propane in a solvent and contacting the resulting solution with from 0.01 to 100.0 moles of activated manganese dioxide per mole of 2,2'-bis-(4-hydroxy-3,5-dimethyl phenyl)propane at a temperature in the range of from 20° to 250° C. for a period of time ranging between 10 seconds and 10 hours and thereafter recovering said aromatic polyether.

14. Method according to claim 13 wherein the molar ratio of activated manganese dioxide to 2,2'-bis-(4-hydroxy-3,5-dimethyl)propane ranges between 3.0:1.0 and 10.0:1.0.

15. Method according to claim 14 wherein said solvent is selected from the group consisting of chloroform, benzene, toluene, nitrobenzene, and dimethylformamide.

16. Method according to claim 13 wherein the temperature is in the range of from 60° to 250° C. for a period of time of from 0.5 to 2 hours.

17. Method according to claim 14 wherein the temperature is in the range of from 60° to 250° C. for a period of time of from 0.5 hour to 2 hours.

References Cited by the Examiner

UNITED STATES PATENTS 3,220,979  11/1965  McNelis _____ 260—47

OTHER REFERENCES

Dewar, J.: Chem. Society, 1958, pp. 917–922, page 922 considered.

Staffin et al.: J.A.C.S., vol. 82, pp. 3632–3634, July 1960.

WILLIAM H. SHORT, *Primary Examiner.*

J. C. MARTIN, *Assistant Examiner.*